US012515369B2

(12) United States Patent
Kameda et al.

(10) Patent No.: US 12,515,369 B2
(45) Date of Patent: Jan. 6, 2026

(54) STAPLER

(71) Applicant: Max Co., Ltd., Tokyo (JP)

(72) Inventors: Futoshi Kameda, Tokyo (JP); Takushi Shindo, Tokyo (JP)

(73) Assignee: Max Co., Ltd., Tokyo (JP)

(*) Notice: Subject to any disclaimer, the term of this patent is extended or adjusted under 35 U.S.C. 154(b) by 51 days.

(21) Appl. No.: 18/396,454

(22) Filed: Dec. 26, 2023

(65) Prior Publication Data

US 2024/0208103 A1 Jun. 27, 2024

(30) Foreign Application Priority Data

Dec. 26, 2022 (JP) ................................ 2022-207979

(51) Int. Cl.

*B27F 7/36* (2006.01)
*B27F 7/19* (2006.01)

(52) U.S. Cl.

CPC . *B27F 7/36* (2013.01); *B27F 7/19* (2013.01)

(58) Field of Classification Search

CPC .................................... B27F 7/19; B27F 7/36
USPC .............................................................. 227/5
See application file for complete search history.

(56) References Cited

U.S. PATENT DOCUMENTS

| | | | | |
|---|---|---|---|---|
| 5,791,543 A * | 8/1998 | Udagawa | B27F 7/28 | 227/4 |
| 2003/0111506 A1* | 6/2003 | Kanai | B27F 7/19 | 227/131 |
| 2006/0213951 A1* | 9/2006 | Yagi | B27F 7/17 | 227/155 |

FOREIGN PATENT DOCUMENTS

| | | |
|---|---|---|
| EP | 1655109 A1 | 5/2006 |
| JP | 2005-059338 A | 3/2005 |

OTHER PUBLICATIONS

Mar. 18, 2024—(EP) Extended EP Search Report—EP App 23219671.7.

* cited by examiner

*Primary Examiner* — Praachi M Pathak
(74) *Attorney, Agent, or Firm* — Banner & Witcoff, Ltd.

(57) ABSTRACT

There is provided a stapler including: a driving portion that drives a staple into a sheet bundle; a clinch portion that bends a leg portion of the staple driven into and penetrating the sheet bundle; a table link that supports the clinch portion at a position facing the driving portion and move the clinch portion in a first direction where the clinch portion separated from and brought into contact with the driving portion; a motor that drives the driving portion; and a regulation portion that moves in a second direction intersecting the first direction while abutting against the table link and regulate a movement of the clinch portion in a direction away from the driving portion. A position where the regulation portion abuts against the table link changes in a direction toward the clinch portion as the clinch portion and the driving portion are separated from each other.

7 Claims, 13 Drawing Sheets

STAPLER

CROSS-REFERENCE TO RELATED APPLICATIONS

This application is based on and claims priority under 35 USC 119 from Japanese Patent Application No. 2022-207979 filed on Dec. 26, 2022, the contents of which are incorporated herein by reference.

TECHNICAL FIELD

The present disclosure relates to a stapler that binds a sheet bundle with a staple.

BACKGROUND ART

In a stapler for binding a sheet bundle with a staple, it is necessary to sandwich the sheet bundle set between a binding table and a unit for driving the staple, to drive the staple to penetrate the sheet bundle after fixing the state, and to bend and clinch leg portions of the staple that has penetrated the sheet bundle by a clincher.

In a stapler of the related art, in order to fix a state in which a sheet bundle is sandwiched, a convex portion of a fixing plate is slid along a guide groove, and an inclined surface of the fixing plate moved to a position corresponding to a thickness of the sheet bundle engages with a fixing pin of a table link that moves a binding table in a wedge shape. In this way, the table link is in a locked state and the binding table cannot be opened (see JP2005-059338A).

In the stapler described in JP2005-059338A, after sheet bundle set between the binding table and a unit for driving a staple is sandwiched, a convex portion moves to a predetermined position and engages with a guide groove, thereby fixing this state. At this time, a distance between a position where the fixing pin of the table link abuts against the fixing plate and a clincher portion is constant regardless of the thickness of the sheet bundle to be sandwiched.

When the distance from the clincher portion to the position where the fixing pin of the table link abuts against the fixing plate is constant, a rigidity of the table link in a state where the sheet bundle is sandwiched therebetween is substantially constant. In the table link, a position of the fixing pin is set so as to maintain the rigidity that can withstand a driving load of a staple even when the driving load necessary for driving the staple into the sheet bundle is the most necessary, such as when the number of sheets to be bound by the staple is large or when the sheet is thick. That is, the table link is set to have a strength that can withstand an assumed maximum driving load. If the table link has rigidity that does not withstand the driving load of the staple, the table link may be deformed in a direction away from a driving portion while the staple penetrates the sheet bundle, and a driving operation may be completed in a state where staple crown of the staple is lifted from the sheet bundle. Therefore, a component strength is set so as not to cause such an event.

After the penetration of the staple into the sheet bundle is completed by the driving of the staple by the driving portion, leg portions of the staple penetrating the sheet bundle are bent toward the sheet bundle by an operation of the clincher portion. The excess of an operation stroke of the clincher portion that bends the leg portions is absorbed by deformation of the table link. That is, the table link is deformed in a clinching operation. The higher the rigidity of the table link is, the larger a load on a motor required to deform the table link is, so that a value of a current flowing through the motor increases.

SUMMARY OF INVENTION

The present disclosure provides a stapler capable of changing a rigidity of a table link according to a thickness of a sheet bundle.

According to an illustrative aspect of the present disclosure, a stapler includes: a driving portion configured to drive a staple into a sheet bundle; a clinch portion configured to bend a leg portion of the staple driven into and penetrating the sheet bundle; a table link configured to support the clinch portion at a position facing the driving portion and move the clinch portion in a first direction in which the clinch portion separated from and brought into contact with the driving portion; a motor configured to drive the driving portion; and a regulation portion configured to move in a second direction intersecting the first direction while abutting against the table link and regulate a movement of the clinch portion in a direction away from the driving portion. A position where the regulation portion abuts against the table link changes in a direction toward the clinch portion as the clinch portion and the driving portion are separated from each other.

In the stapler, when the regulation portion moves in a direction in which the regulation portion is separated from and brought into contact with the clinch portion, the distance from the position where the regulation portion abuts against the table link to the clinch portion changes. In the table link, when the distance from the position where the regulation portion abuts against the table link to the clinch portion is short, the rigidity is higher than when the distance is long, and the rigidity is lower as the distance is longer. That is, the rigidity of the table link is changed by changing the portion where the regulation portion abuts against the table link. Accordingly, it is possible to maintain high rigidity when the sheet bundle is thick, for example, when the number of sheets to be bound by a staple is large or when the sheet is thick, and to reduce rigidity when the sheet bundle is thin, for example, when the number of sheets is small or when the sheet is thin.

In the stapler, it is possible to change the rigidity of the table link in accordance with the number of sheets and a thickness of the sheet to be bound by a staple. Accordingly, when the number of sheets to be bound by a staple is large or when the sheet is thick, by increasing the rigidity of the table link, it is possible to prevent staple crown of the staple from lifting from the sheet bundle at a timing when the driving portion drives the staple into the sheet bundle. Further, when the number of sheets to be bound by the staple is small or when the sheet is thin, the rigidity of the table link is lowered, so that it is possible to allow deflection of the table link at a timing at which the clinch portion that bends the leg portion is operated, and to prevent an increase in a value of a current flowing through the motor.

DESCRIPTION OF EMBODIMENTS

Hereinafter, an embodiment of a stapler according to the present disclosure will be described with reference to the drawings.

Configuration Example of Stapler According to the Present Embodiment

Figure 1A:
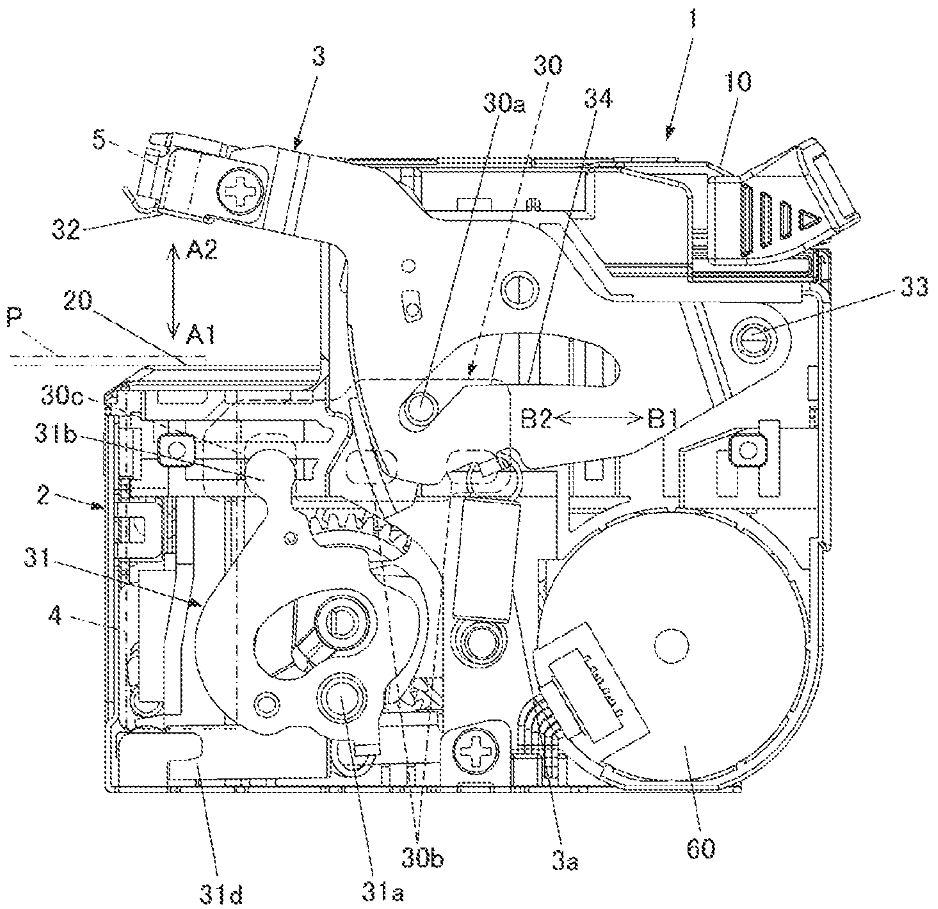
FIG. 1A is a side view illustrating an example of a stapler according to an embodiment.
Figure 1B:
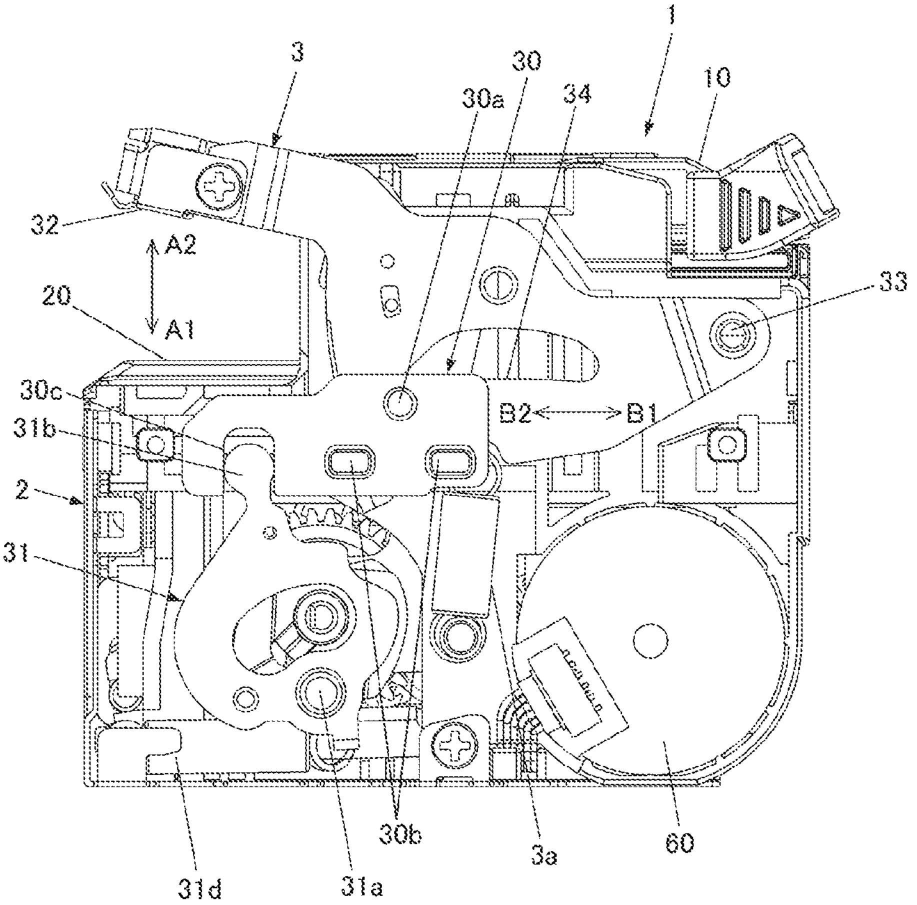
FIG. 1B is a side view illustrating the example of the stapler according to the embodiment.
Figure 1C:
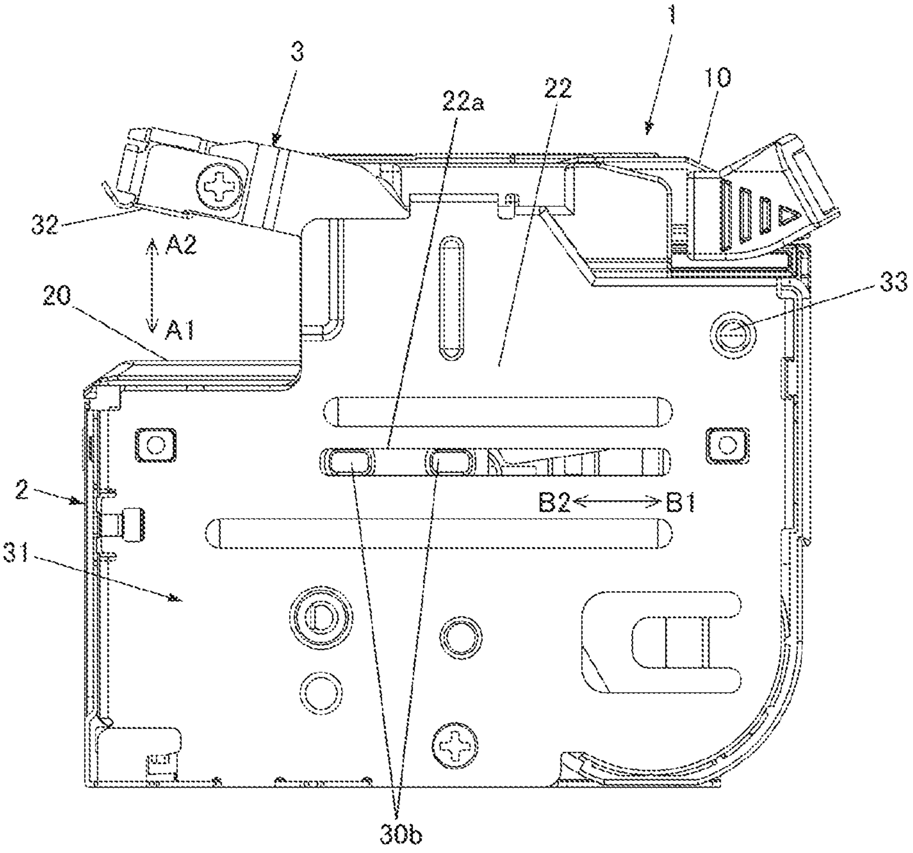
FIG. 1C is a side view illustrating the example of the stapler according to the embodiment.
Figure 2:
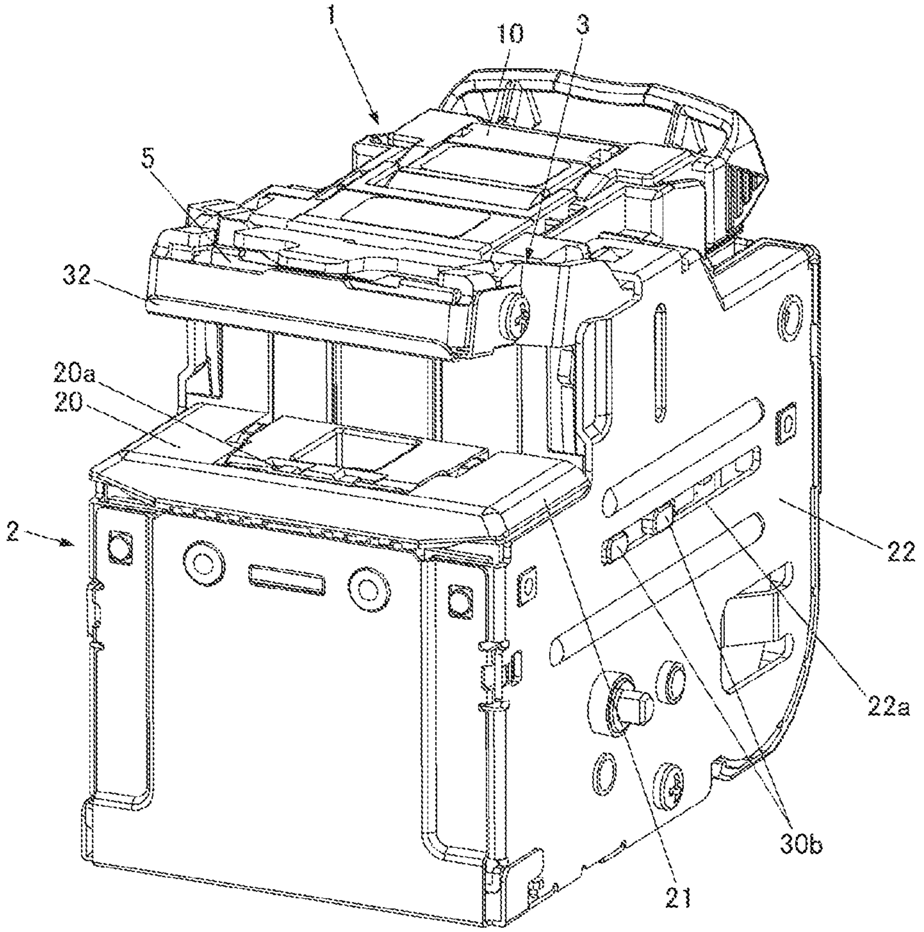
FIG. 2 is a perspective view illustrating the example of the stapler according to the embodiment.

FIGS. 1A, 1B, and 1C are side views illustrating an example of a stapler according to the present embodiment, FIGS. 1A and 1B illustrate an internal configuration of a stapler 1, and FIG. 1A illustrates an internal structure through a lock plate 30 to be described later. FIG. 2 is a perspective view illustrating an example of the stapler according to the present embodiment.

The stapler 1 includes a main body portion 2 and table links 3 movably supported by the main body portion 2. The stapler 1 further includes the lock plates 30 for moving the table links 3 and clamp lock links 31 for moving the lock plates 30.

In the stapler 1, a cartridge 10 in which a staple (not illustrated) is accommodated is detachably attached to the main body portion 2.

The main body portion 2 includes a driving portion 4 that drives a staple (not illustrated) accommodated in the cartridge 10 into a sheet bundle P. Further, the main body portion 2 includes a first table 20 for sandwiching the sheet bundle P. The first table 20 is constituted by a portion facing one end portion of the table link 3 in a housing 21 of the main body portion 2. The first table 20 includes a part of the housing 21 when the first table 20 is attached to the main body portion 2 and a part of the cartridge 10 exposed to the housing 21, and a passage opening 20*a* through which a staple (not illustrated) driven into by the driving portion 4 passes is exposed. The driving portion 4 includes a driver (not illustrated) for driving a staple, a mechanism for driving the driver, and a passage through which the staple driven by the driver passes in the cartridge 10.

A clinch portion 5 for bending leg portions of a staple (not illustrated) penetrating the sheet bundle P is attached to the table link 3. A second table 32 for sandwiching the sheet bundle P is attached to the table link 3.

The clinch portion 5 and the second table 32 are attached to one end side of the table link 3 at positions where the clinch portion 5 and the second table 32 face the driving portion 4 and the first table 20. The clinch portion 5 is attached at a position where the clinch portion 5 faces the passage opening 20*a*. The other end side of the table link 3 is rotatably supported on the main body portion 2 by a shaft 33.

The table link 3 rotates about the shaft 33, thereby moving the clinch portion 5 and the second table 32 along a first direction in which the clinch portion 5 and the second table 32 are separated from and brought into contact with the driving portion 4 and the first table 20 of the main body portion 2. The table link 3 is urged by an urging member 3*a* such as a coil spring in a direction in which the clinch portion 5 and the second table 32 approach the driving portion 4 and the first table 20.

When the table link 3 rotates about the shaft 33 in one direction, the clinch portion 5 and the second table 32 move in an arrow A1 direction toward the driving portion 4 and the first table 20 of the main body portion 2. The arrow A1 direction is one of the first direction in which the clinch portion 5 and the second table 32 are separated from and brought into contact with the driving portion 4 and the first table 20. When the table link 3 rotates about the shaft 33 in the other direction opposite to the one direction, the clinch portion 5 and the second table 32 move in an arrow A2 direction opposite to the arrow A1 direction and away from the driving portion 4 and the first table 20 of the main body portion 2. The arrow A2 direction is the other of the first direction in which the clinch portion 5 and the second table 32 are separated from and brought into contact with the driving portion 4 and the first table 20.

The lock plate 30 includes a regulation portion 30*a* that abuts against the table link 3. The regulation portion 30*a* moves along a second direction intersecting with the first direction toward and away from the clinch portion 5. The lock plate 30 is supported by the main body portion 2 so as to be movable along the second direction indicated by arrows B1 and B2.

The main body portion 2 includes frame abutting portions 22*a* that movably support the lock plates 30. Each of the frame abutting portions 22*a* is provided with an elongated hole-shaped opening extending along the second direction in a frame 22 constituting the exterior of the main body portion 2.

The lock plate 30 includes slide guides 30*b* guided by the frame abutting portion 22*a*. Each of the slide guides 30*b* is an example of a guide portion, is constituted by an oval convex portion along the second direction, and protrudes laterally from the lock plate 30. In addition, the slide guides 30*b* are provided at a plurality of positions along the second direction, at two positions in the present embodiment.

The lock plate 30 is supported by the main body portion 2 such that the slide guides 30*b* are guided by the frame abutting portion 22*a* by fitting the slide guides 30*b* into the frame abutting portion 22*a*, and the lock plate 30 is movable in the arrow B1 direction in which the regulation portion 30*a* moves away from the clinch portion 5 and the arrow B2 direction in which the regulation portion 30*a* approaches the clinch portion 5 in the direction opposite to the arrow B1 direction. The arrow B1 direction is one of the second direction intersecting the first direction in which the clinch portion 5 and the second table 32 are separated from and brought into contact with the driving portion 4 and the first table 20. The arrow B2 direction is the other of the second direction intersecting the first direction.

Since the lock plate 30 is provided with the slide guides 30*b* at two positions along the second direction, the slide guides 30*b* are supported by the frame abutting portion 22*a* at two front and rear positions along a moving direction of the lock plate 30. Accordingly, the lock plate 30 is prevented from rotating about the one slide guide 30*b* or the like.

The lock plate 30 is provided with the regulation portion 30*a* in the vicinity of a center between the two slide guides 30*b*. Accordingly, when a force is applied to the regulation portion 30*a*, the force is substantially equally applied to the two slide guides 30*b*, and the lock plate 30 is prevented from rotating about the one slide guide 30*b* or the like. Further, wear of only one slide guide 30*b* can be prevented.

The table link 3 includes an abutting portion 34 against which the regulation portion 30*a* abuts. The abutting portion 34 is formed of a grooved cam that penetrates through the front and back of the table link 3 and has a substantially V-shaped elongated hole in which the regulation portion 30*a* is inserted in a direction away from the clinch portion 5 from one end side toward the other end side of the table link 3. In the present embodiment, the abutting portion 34 is formed as an elongated hole inside the table link 3, but an outer shape of the table link 3 may be formed as the abutting portion 34.

When the table link 3 rotates about the shaft 33, the abutting portion 34 is inclined with respect to the moving direction of the lock plate 30 according to a rotation angle of the table link 3 with respect to the main body portion 2, and obliquely intersects with a movement path of the regulation portion 30*a*.

When the regulation portion 30*a* of the table link 3 is located at a standby position illustrated in FIG. 1A, the clinch portion 5 and the second table 32 are located at a standby position away from the driving portion 4 and the first table 20. In a state where the regulation portion 30*a* is located at the standby position, the regulation portion 30*a* abuts against a surface of the abutting portion 34 in the arrow A2 direction, and the table link 3 is held at the standby position by the urging force of the urging member 3*a* without rotating the clinch portion 5 and the second table 32 in the direction of approaching the driving portion 4 and the first table 20.

When the lock plate 30 moves in the arrow B1 direction, the regulation portion 30*a* moves from the standby position to push the abutting portion 34 of the table link 3 and rotates the table link 3 about the shaft 33 in cooperation with the urging force of the urging member 3*a*, thereby moving the clinch portion 5 and the second table 32 in the arrow A1 direction toward the driving portion 4 and the first table 20. When the lock plate 30 moves in the arrow B2 direction, the regulation portion 30*a* moves the clinch portion 5 and the second table 32 in the arrow A2 direction away from the clinch portion 5 along the second direction intersecting the first direction in which the clinch portion 5 and the second table 32 are separated from and brought into contact with the driving portion 4 and the first table 20.

Accordingly, the regulation portion 30*a* moves along the second direction, thereby rotating the table link 3 along the first direction in which the clinch portion 5 is separated from and brought into contact with the driving portion 4. When the regulation portion 30*a* moves along the second direction, the position where the regulation portion 30*a* abuts against the abutting portion 34 of the table link 3 changes according to a distance between the clinch portion 5 and the driving portion 4. Further, the regulation portion 30*a* regulates the movement of the table link 3 in the first direction and regulates the movement of the clinch portion 5 in the arrow A2 direction away from the driving portion 4 in a state where the position of the regulation portion 30*a* abutting against the abutting portion 34 of the table link 3 is changed according to the distance between the clinch portion 5 and the driving portion 4 by moving in the second direction.

The clamp lock link 31 is supported by the main body portion 2 so as to be rotatable about a shaft 31*a* located away from a center position of the component. The clamp lock link 31 includes an engagement portion 31*b* at a position away from the center position of the component toward a side opposite to a side supported by the shaft 31*a*. The engagement portion 31*b* protrudes from an outer periphery of the clamp lock link 31 in a direction opposite to the side supported by the shaft 31*a*. In the clamp lock link 31, the engagement portion 31*b* reciprocates in the arrow B1 direction and the arrow B2 direction by a rotation operation about the shaft 31*a*. The clamp lock link 31 is urged by an urging member 31*d* such as a coil spring in a direction in which the engagement portion 31*b* moves in the arrow B1 direction.

The lock plate 30 includes an engaged portion 30*c* that engages with the engagement portion 31*b* of the clamp lock link 31. The engaged portion 30*c* is formed by a recess having a shape with which the engagement portion 31*b* is engaged.

Figure 3A:
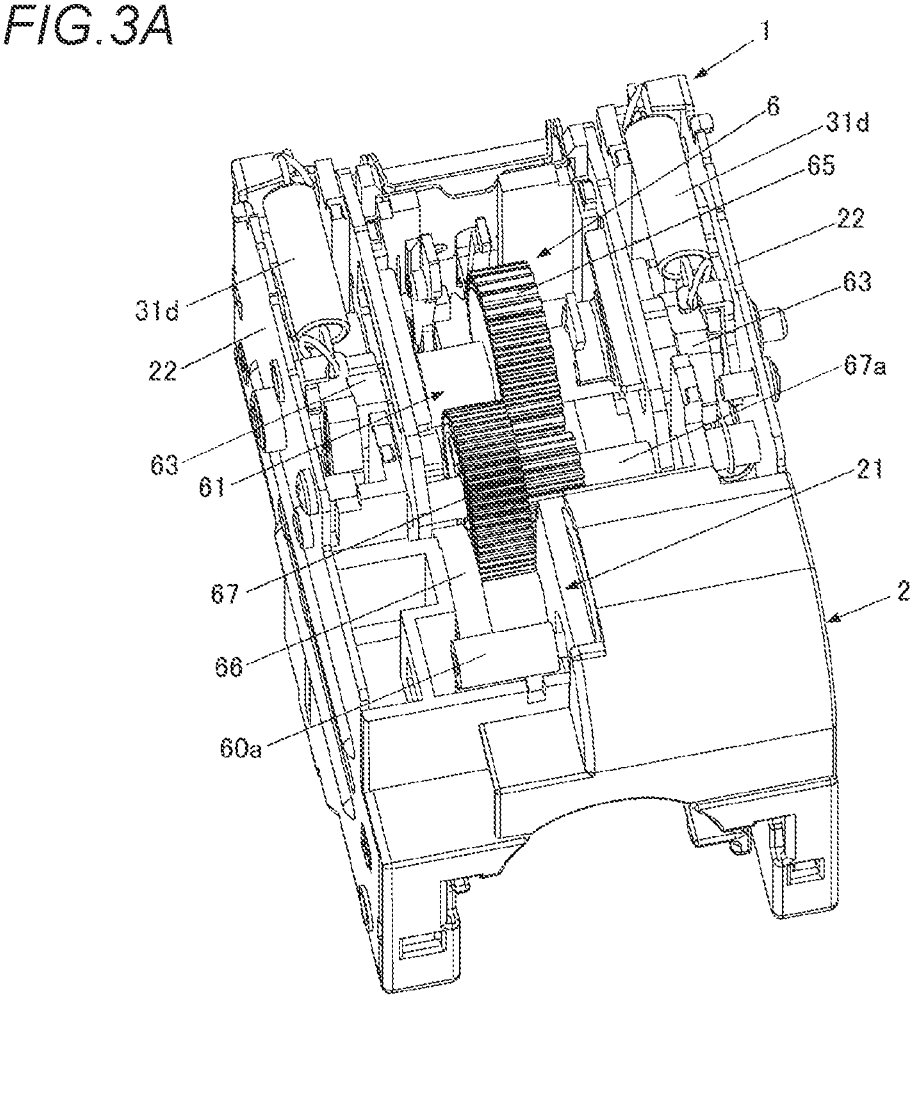
FIG. 3A is a perspective view of the stapler illustrating an example of a drive unit.
Figure 3B:
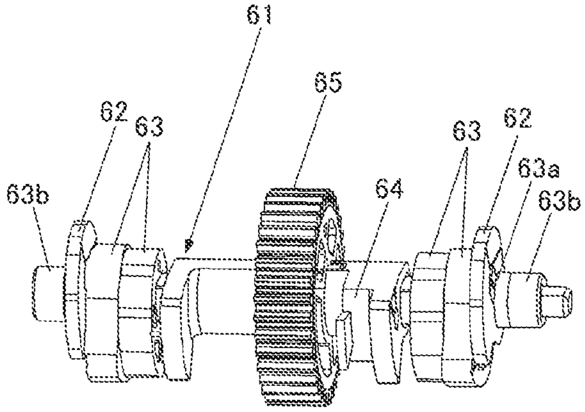
FIG. 3B is a perspective view of a main part illustrating the example of the drive unit.
Figure 3C:
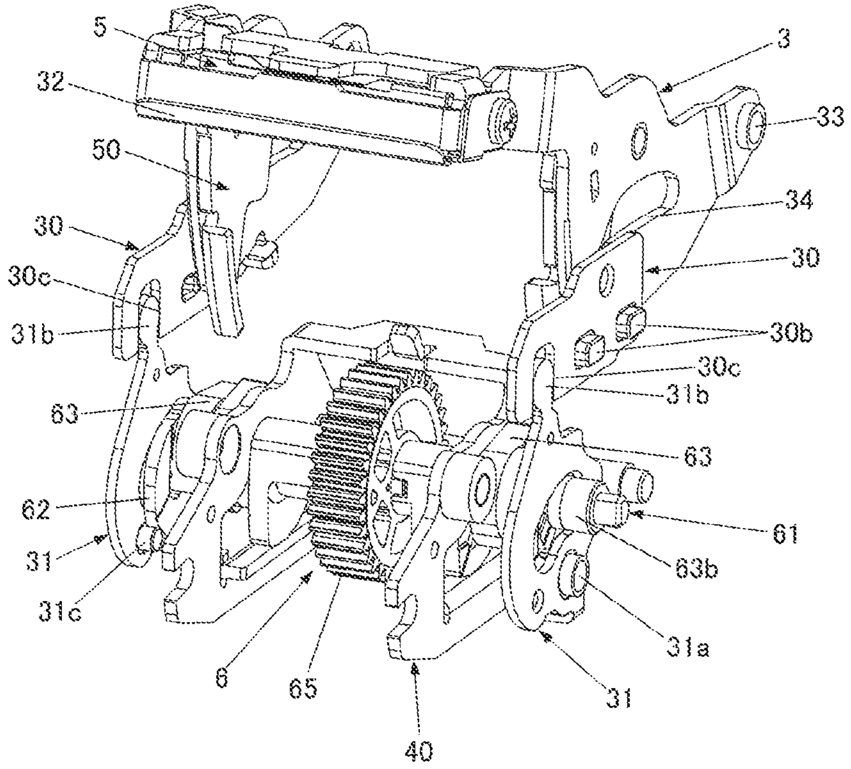
FIG. 3C is a perspective view of a main part illustrating the example of the drive unit.
Figure 3D:
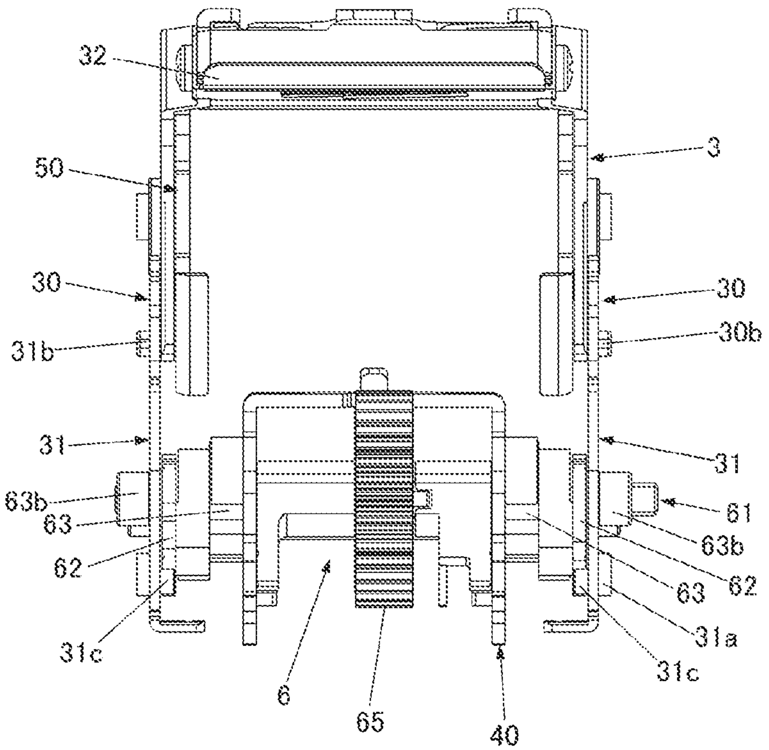
FIG. 3D is a front view of a main part illustrating the example of the drive unit.

FIG. 3A is a perspective view of the stapler illustrating an example of a drive unit, FIGS. 3B and 3C are perspective views of a main part illustrating the example of the drive unit, and FIG. 3D is a front view of a main part illustrating the example of the drive unit.

The stapler 1 includes a drive unit 6 that drives the table link 3, the driving portion 4, the clinch portion 5, and the like. The drive unit 6 includes a motor 60 and a drive shaft 61 that is driven by the motor 60 to rotate. The drive shaft 61 includes clamp cams 62 that drive the table links 3, driver clinch cams 63 that drive the driver (not illustrated) of the driving portion 4 in a staple driving direction and drive the clinch portion 5, a driver return cam 64 that drives the driver (not illustrated) of the driving portion 4 in a direction opposite to the staple driving direction, and a drive gear 65 to which a drive force for rotating the drive shaft 61 is transmitted.

Each of the clamp cams 62 is made of sheet metal. The clamp cam 62 is engaged with an engagement-convex portion 31*c* of the clamp lock link 31, and pushes the engagement-convex portion 31*c* by the rotation of the drive shaft 61 to rotate the clamp lock link 31, thereby moving the lock plate 30 and driving the table link 3 via the lock plate 30.

Each of the driver clinch cams 63 is made of resin. The driver clinch cam 63 is integrally formed with a cam engaging with a driver link 40 connected to the driver (not illustrated) of the driving portion 4 and a cam engaging with a clinch link 50 connected to the clinch portion 5. In addition, the driver clinch cam 63 is integrally formed with a support portion 63*a* of the clamp cam 62 and a bearing portion 63*b*. The driver clinch cam 63 is press-fitted to the drive shaft 61. The clamp cam 62 is press-fitted to the support portion 63*a* of the driver clinch cam 63. This configuration prevents the clamp cam 62 and the driver clinch cam 63 from rattling.

The drive shaft 61 is provided with the drive gear 65 in the vicinity of a center thereof in an extending direction, and the driver return cam 64, the driver clinch cam 63, and the clamp cam 62 are provided in this order from the drive gear 65 on one side of the drive shaft 61 across the drive gear 65. The driver clinch cam 63 and the clamp cam 62 are provided in this order from the drive gear 65 on the other side of the drive shaft 61 across the drive gear 65.

The drive shaft 61 is supported by one frame 22 via the bearing portion 63*b* of one driver clinch cam 63 on one end side thereof in the extending direction. In addition, the drive shaft 61 is supported by the other frame 22 via the bearing portion 63*b* of the other driver clinch cam 63 on the other end side thereof in the extending direction. Accordingly, the drive shaft 61 is supported by the frames 22 on both sides thereof sandwiching the drive gear 65.

The drive unit 6 includes a first intermediate gear 66 that meshes with the gear 60*a* of the motor 60, and a second intermediate gear 67 that meshes with the first intermediate gear 66 and the drive gear 65.

The first intermediate gear 66 is supported by the housing 21 on both sides in an extending direction of a shaft (not illustrated). The second intermediate gear 67 is supported by the frames 22 on both sides in an extending direction of a shaft 67*a*.

Accordingly, in a configuration in which each of the drive gear 65, the first intermediate gear 66, and the second intermediate gear 67 is supported on both sides of the shaft, it is possible to prevent bending of the shaft due to application of a biased force to the shaft. Further, the drive gear 65, the first intermediate gear 66, and the second intermediate gear 67 can be provided inside the left and right frames 22, respectively, and the size of the stapler 1 can be reduced compared to a configuration in which each gear is provided outside the frames 22.

Operation Example of Stapler According to the Present Embodiment

Figure 4A:
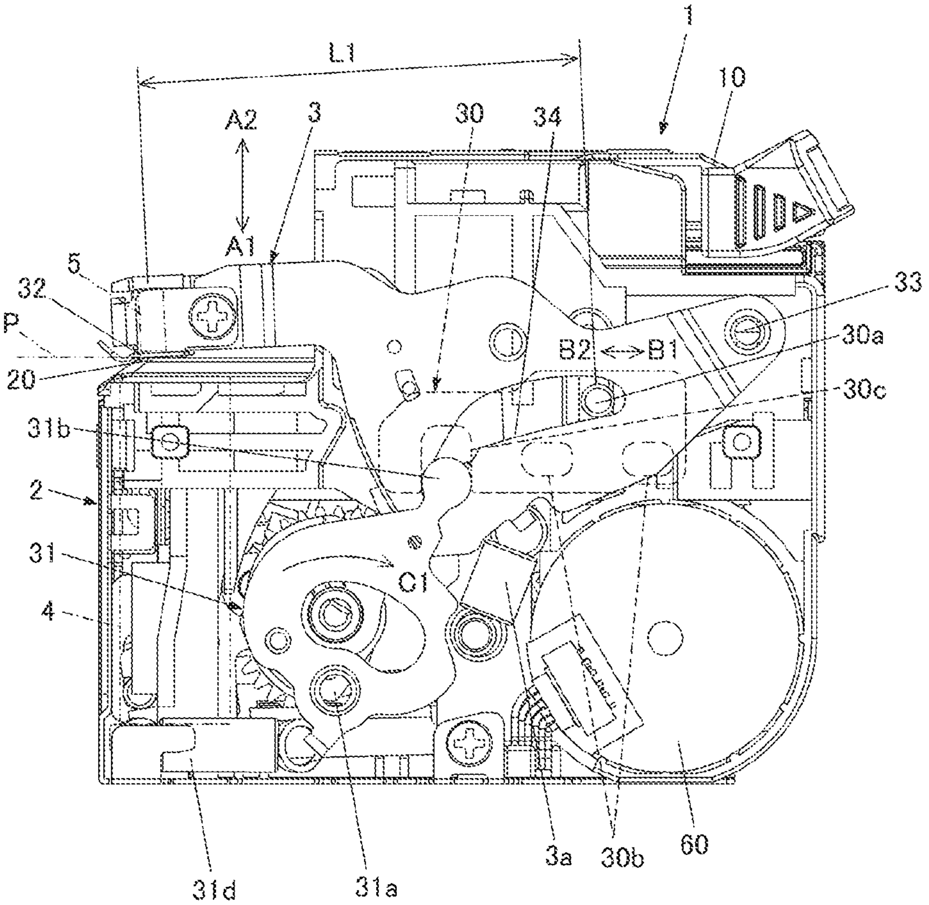
FIG. 4A is a side view illustrating an example of an operation of the stapler according to the present embodiment when the number of sheets to be bound by a staple is small or when the sheet is thin.
Figure 4B:
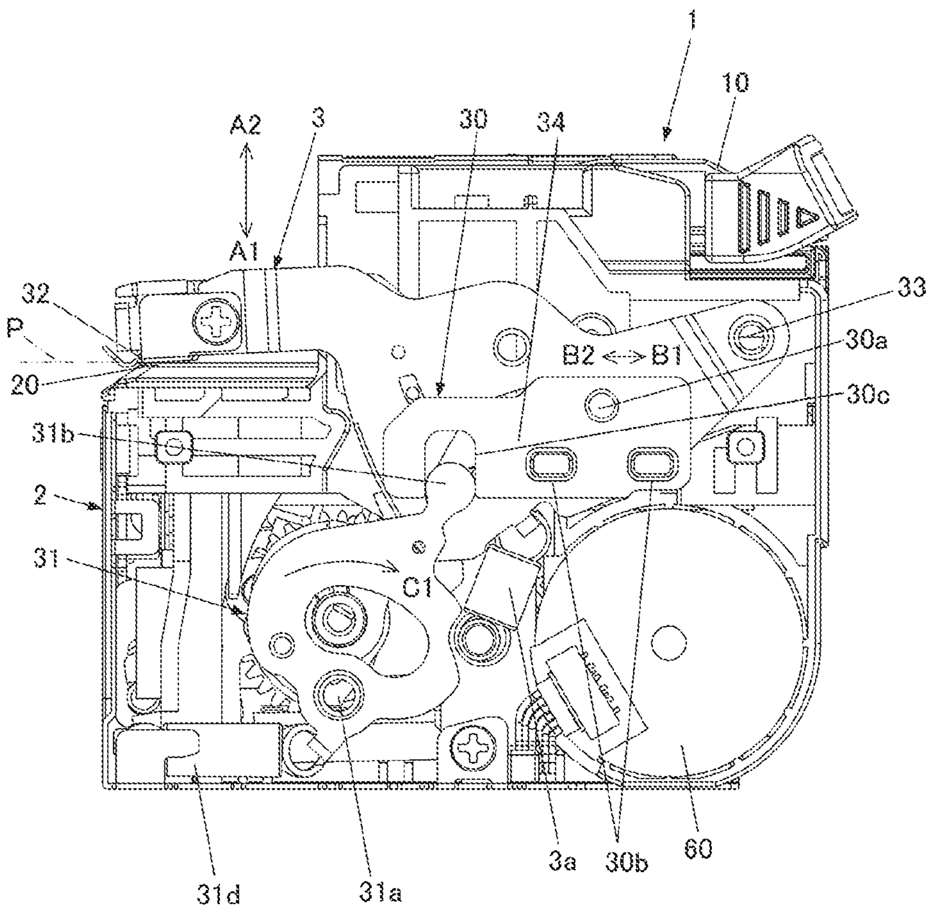
FIG. 4B is a side view illustrating the example of the operation of the stapler according to the present embodiment when the number of sheets to be bound by a staple is small or when the sheet is thin.
Figure 4C:
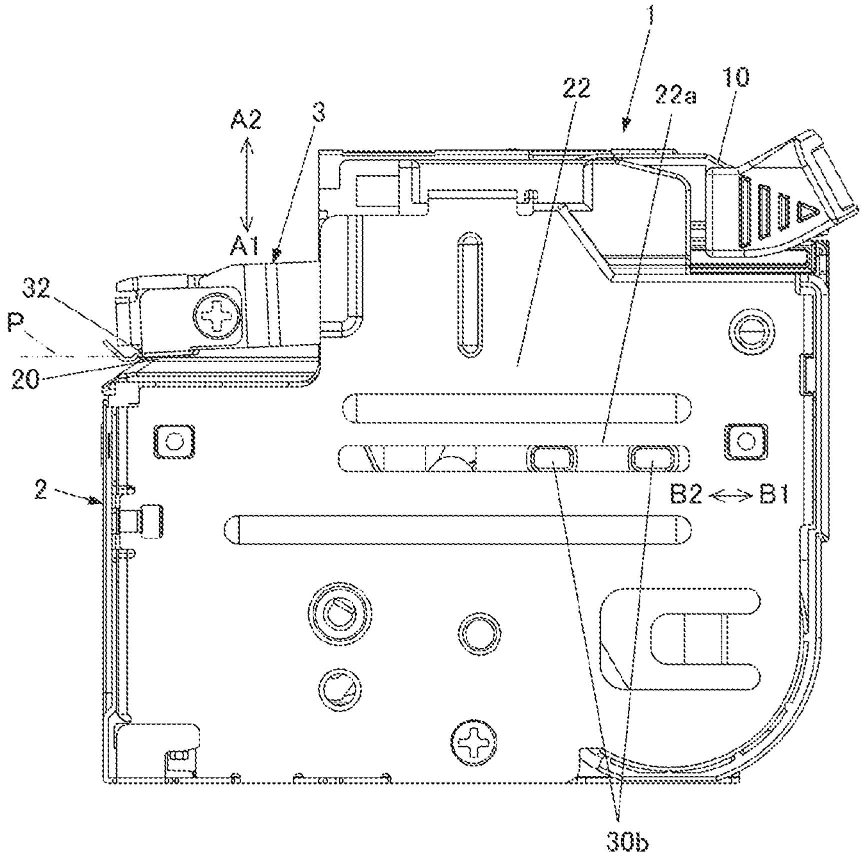
FIG. 4C is a side view illustrating the example of the operation of the stapler according to the present embodiment when the number of sheets to be bound by a staple is small or when the sheet is thin.
Figure 5A:
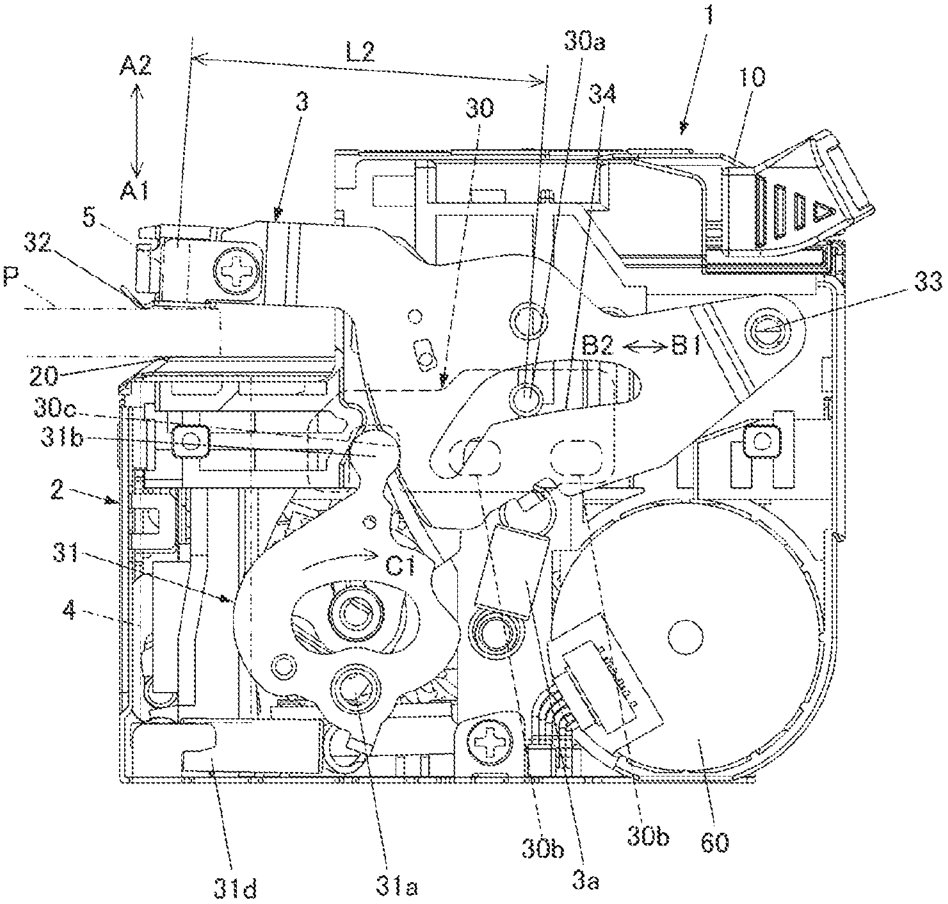
FIG. 5A is a side views illustrating an example of an operation of the stapler according to the present embodiment when the number of sheets to be bound by a staple is large or when the sheet is thick.
Figure 5B:
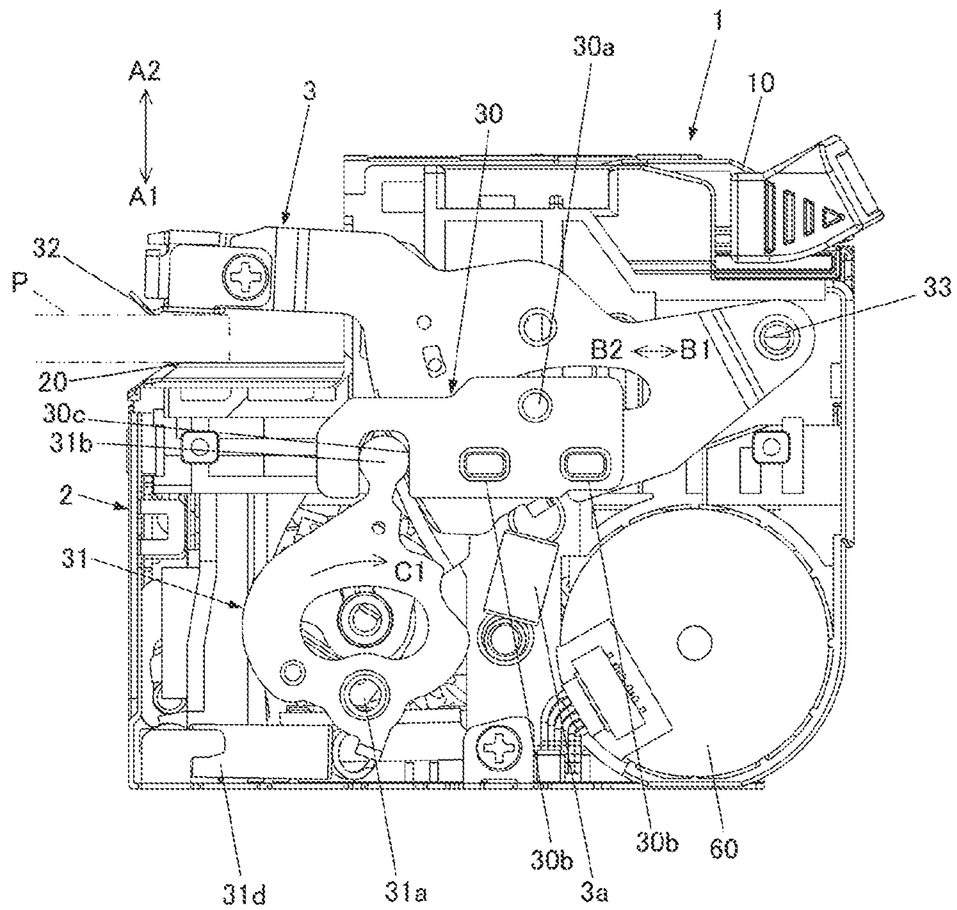
FIG. 5B is a side view illustrating the example of the operation of the stapler according to the present embodiment when the number of sheets to be bound by a staple is large or when the sheet is thick.
Figure 5C:
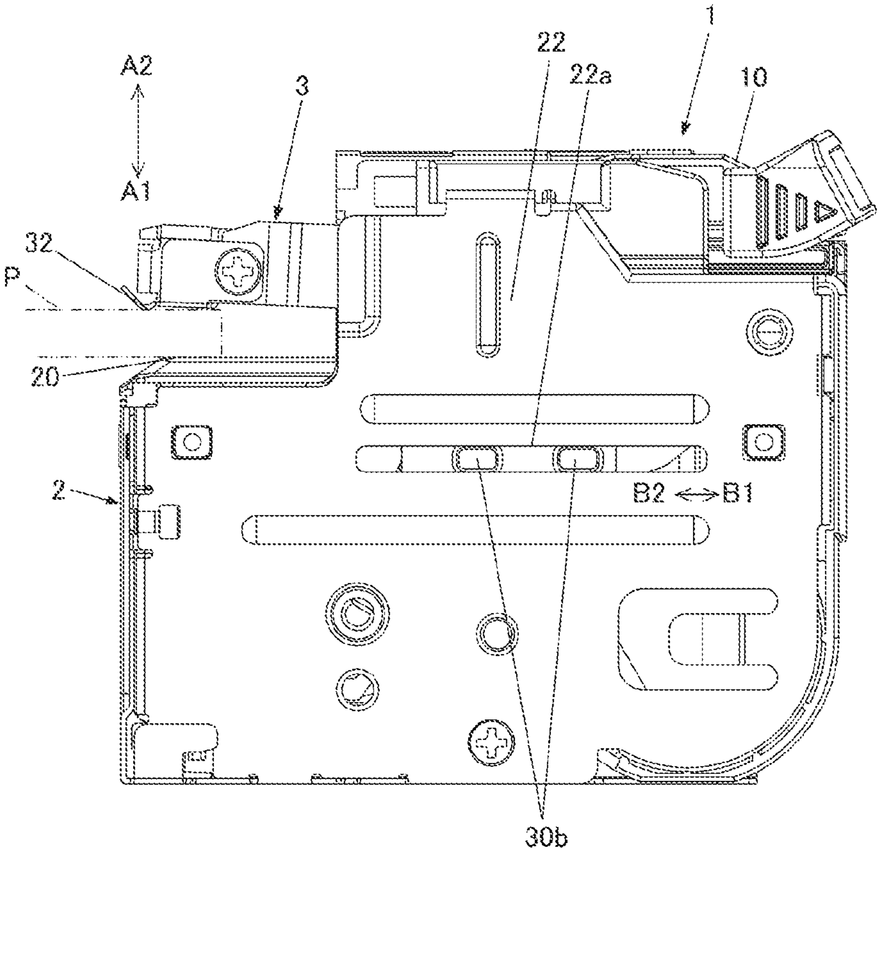
FIG. 5C is a side view illustrating the example of the operation of the stapler according to the present embodiment when the number of sheets to be bound by a staple is large or when the sheet is thick.

FIGS. 4A, 4B, and 4C are side views illustrating an example of an operation of the stapler according to the present embodiment when the number of sheets to be bound by a staple is small or when the sheet is thin, FIGS. 4A and 4B show an internal configuration of the stapler 1, and FIG. 4A shows the internal structure through the lock plate 30. In addition, FIGS. 5A, 5B, and 5C are side views illustrating an example of an operation of the stapler according to the present embodiment when the number of sheets to be bound by a staple is large or when the sheet is thick, FIGS. 5A and 5B show an internal configuration of the stapler 1, and FIG. 5A shows the internal structure through the lock plate 30.

Next, the example of the operation of the stapler according to the present embodiment will be described with reference to the drawings. In the stapler 1, when the motor 60 rotates and the clamp cam 62 rotates, the clamp lock link 31 rotates in an arrow C1 direction about the shaft 31*a* in cooperation with the urging member 31*d*. When the clamp lock link 31 rotates in the arrow C1 direction, the lock plate 30 in which the engagement portion 31*b* of the clamp lock link 31 and the engaged portion 30*c* are engaged with each other moves in the arrow B1 direction.

When the lock plate 30 moves in the arrow B1 direction, the regulation portion 30*a* moving integrally with the lock plate 30 pushes the abutting portion 34 of the table link 3. In the table link 3, an inclined portion of the abutting portion 34 is pushed by the regulation portion 30*a* moving in the arrow B1 direction when the abutting portion 34 obliquely intersects the movement path of the regulation portion 30*a*.

In the table link 3, when the abutting portion 34 is pushed by the regulation portion 30*a* in the arrow B1 direction, the clinch portion 5 and the second table 32 rotate about the shaft 33 in cooperation with the urging member 3*a* in the arrow A1 direction approaching the driving portion 4 and the first table 20.

When the table link 3 rotates in the arrow A1 direction, the sheet bundle P is sandwiched between the first table 20 and the second table 32.

When the lock plate 30 moves in the arrow B1 direction and the table link 3 rotates in the arrow A1 direction, the position where the regulation portion 30*a* abuts against the abutting portion 34 moves in the direction away from the clinch portion 5. That is, the distance from the position where the regulation portion 30*a* abuts against the abutting portion 34 to the clinch portion 5 changes in accordance with the distance between the clinch portion 5 and the driving portion 4.

In the stapler 1, when the number of sheets to be bound by a staple is small or when the sheet is thin, the sheet bundle P sandwiched between the first table 20 and the second table 32 is thinner than when the number of sheets to be bound by a staple (not illustrated) is large or when the sheet is thick.

Accordingly, in the stapler 1, when the number of sheets to be bound by a staple is small or when the sheet is thin, the distance between the clinch portion 5 and the driving portion 4 is shorter than when the number of sheets to be bound by a staple is large or when the sheet is thick.

In the stapler 1, as illustrated in FIGS. 4A, 4B, and 4C, when the distance between the clinch portion 5 and the driving portion 4 becomes shorter, a distance L1 from the position where the regulation portion 30*a* abuts the abutting portion 34 to the clinch portion 5 is longer than a distance L2 when the distance between the clinch portion 5 and the driving portion 4 is long, as illustrated in FIGS. 5A, 5B, and 5C.

In the stapler 1, after the sheet bundle P is sandwiched between the first table 20 and the second table 32, the motor 60 further rotates so that a staple (not illustrated) is driven into the sheet bundle P by an operation of the driving portion 4.

In the stapler 1, when the number of sheets to be bound by a staple is large, or when the sheet is thick, compared to when the number of sheets to be bound by a staple is small, or when the sheet is thin, a contact surface between the leg portion and the sheet bundle becomes large when the leg portion of the staple penetrates the sheet bundle P.

Accordingly, in the stapler 1, when the number of sheets to be bound by a staple is large or when the sheet is thick, a force required to cause the leg portion of the staple to penetrate the sheet bundle P is increased during the operation of driving a staple into the sheet bundle P.

In the table link 3, the regulation portion 30*a* abuts against the abutting portion 34 between the clinch portion 5 and the shaft 33. Accordingly, when the distance from the position where the regulation portion 30*a* abuts against the abutting portion 34 to the clinch portion 5 is short, a rigidity of the table link 3 is higher than that when the distance is long.

As illustrated in FIGS. 5A, 5B, and 5C, when the number of sheets to be bound by a staple is large or when the sheet is thick, the distance L2 from the position where the regulation portion 30*a* abuts against the abutting portion 34 to the clinch portion 5 is shorter than when the number of sheets to be bound by a staple is small or when the sheet is thin as illustrated in FIGS. 4A, 4B, and 4C.

Accordingly, when the number of sheets to be bound by a staple is large or when the sheet is thick, it is possible to prevent the table link 3 from being bent by the operation of driving the staple into the sheet bundle P by the driving portion 4 and to drive a staple into the sheet bundle so that staple crown of the staple is not lifted from the sheet bundle.

In the stapler 1, after a staple is driven into the sheet bundle, the motor 60 is further rotated to bend the leg portion of the staple (not illustrated) by the operation of the clinch portion 5.

In the stapler 1, in the operation of bending the leg portion of the staple penetrating the sheet bundle P at the clinch portion, a force to rotate the table link 3 in the arrow A2 direction is applied by a reaction force of a force with which the clinch portion 5 presses the leg portion.

In the stapler 1, the operation of the table link 3 that sandwiches the sheet bundle P and the operation of the clinch portion 5 that bends the leg portion of the staple are interlocked with each other, and the rotation of the motor 60 continues in a state where the sheet bundle P is sandwiched between the first table 20 and the second table 32.

When the operation of the clinch portion 5 that bends the leg portion of the staple is performed in a state where the regulation portion 30*a* and the abutting portion 34 abut against each other and the rotation of the table link 3 in the arrow A2 direction is regulated, the force to rotate the table link 3 in the arrow A2 direction is applied. The excess of an operation stroke of the clinch portion 5 is absorbed by deformation of the table link 3.

In the stapler 1, a load required for deforming the table link 3 increases as the rigidity of the table link 3 increases. At this time, a load applied to the motor 60 via the drive unit 6 increases, and a value of a current flowing through the motor 60 increases.

As illustrated in FIGS. 4A, 4B, and 4C, when the number of sheets to be bound by a staple is small or when the sheet is thin, the distance L1 from the position where the regulation portion 30*a* abuts against the abutting portion 34 to the clinch portion 5 is longer than the distance L2 when the number of sheets to be bound by a staple is large or when the sheet is thick as illustrated in FIGS. 5A, 5B, and 5C.

When the distance from the position where the regulation portion 30*a* abuts against the abutting portion 34 to the clinch portion 5 is long, the rigidity of the table link 3 is lower than that when the distance is short. When the rigidity of the table link 3 decreases, the table link 3 can be bent when the force to rotate the table link 3 in the arrow A2 direction is applied.

Accordingly, when the number of sheets to be bound by a staple is small or when the sheet is thin, when the force to rotate the table link 3 in the arrow A2 direction is applied at the time of the operation of bending the leg portion of the staple by the clinch portion 5, it is possible to bend the table link 3, and to prevent an increase in the value of the current flowing through the motor 60.

What is claimed is:

1. A stapler comprising:

a driving portion configured to drive a staple into a sheet bundle;

a clinch portion configured to bend a leg portion of the staple driven into and penetrating the sheet bundle;

a table link configured to support the clinch portion at a position facing the driving portion and move the clinch portion in a first direction in which the clinch portion is separated from and brought into contact with the driving portion;

a motor configured to drive the driving portion; and a regulation portion configured to move in a second direction intersecting the first direction while abutting against the table link and regulate a movement of the clinch portion in a direction away from the driving portion, wherein the table link has one end side to which the clinch portion is attached, the other end side which is rotatably supported by a shaft, and an abutting portion against which the regulation portion abuts between the clinch portion and the shaft, and a position where the regulation portion abuts against the table link: changes in a direction toward the clinch portion as the clinch portion and the driving portion are separated from each other; and changes in a direction away from the clinch portion as the clinch portion and the driving portion approach each other.

2. The stapler according to claim 1, further comprising:

a lock plate having the regulation portion; and a frame abutting portion configured to support the lock plate to be movable along the second direction, wherein the lock plate has a guide portion that is guided by the frame abutting portion.

3. The stapler according to claim 2, wherein the lock plate includes a plurality of guide portions including the guide portion provided along the second direction, and the regulation portion is provided between the plurality of guide portions.

4. The stapler according to claim 2, wherein the motor is configured to move the lock plate.

5. The stapler according to claim 2, wherein the frame abutting portion is an opening shaped in an elongated hole, and is configured to guide the guide portion to be movable horizontally.

6. The stapler according to claim 1, wherein the abutting portion is formed by a grooved cam extending in a direction away from the clinch portion.

7. The stapler according to claim 1, wherein the abutting portion is a grooved cam that penetrates through a front and back of the table link, and is shaped in an elongated hole extending in a direction away from the clinch portion.

* * * * *